United States Patent [19]

Gray et al.

[11] 4,274,683
[45] Jun. 23, 1981

[54] SUPPORT ELEMENT FOR COMPLIANT HYDRODYNAMIC JOURNAL BEARINGS

[75] Inventors: Stanley Gray, Skaneateles; Bharat Bhushan, Watervliet, both of N.Y.

[73] Assignee: Mechanical Technology Incorporated, Latham, N.Y.

[21] Appl. No.: 974,263

[22] Filed: Dec. 29, 1978

[51] Int. Cl.³ .................. F16C 32/06; F16C 17/02
[52] U.S. Cl. .................................. 308/9; 308/121; 308/DIG. 1
[58] Field of Search .............. 308/9, 26, 36.3, 73, 308/121, 122, 240, DIG. 1, DIG. 4, DIG. 15

[56] References Cited

U.S. PATENT DOCUMENTS

| | | | |
|---|---|---|---|
| 3,809,443 | 5/1974 | Cherubim | 308/9 |
| 3,884,534 | 5/1975 | Winn | 308/9 |
| 4,133,585 | 1/1979 | Licht | 308/121 |

Primary Examiner—Richard R. Stearns
Attorney, Agent, or Firm—Joseph V. Claeys; John M. Neary

[57] ABSTRACT

A compliant hydrodynamic fluid journal bearing system tolerant of strong misalignment forces includes an end section at each axial end of the bearing system which lies parallel to the direction of rotation of the rotor. The end sections are more compliant than the central section of the bearing system and can deflect independently of it to conform independently with a misaligned rotor bearing surface without distorting other portions of the bearing. The surface area of the bearing which is thus made available to bear loads is maximized, thereby increasing load capacity and misalignment tolerance of the bearings.

23 Claims, 9 Drawing Figures

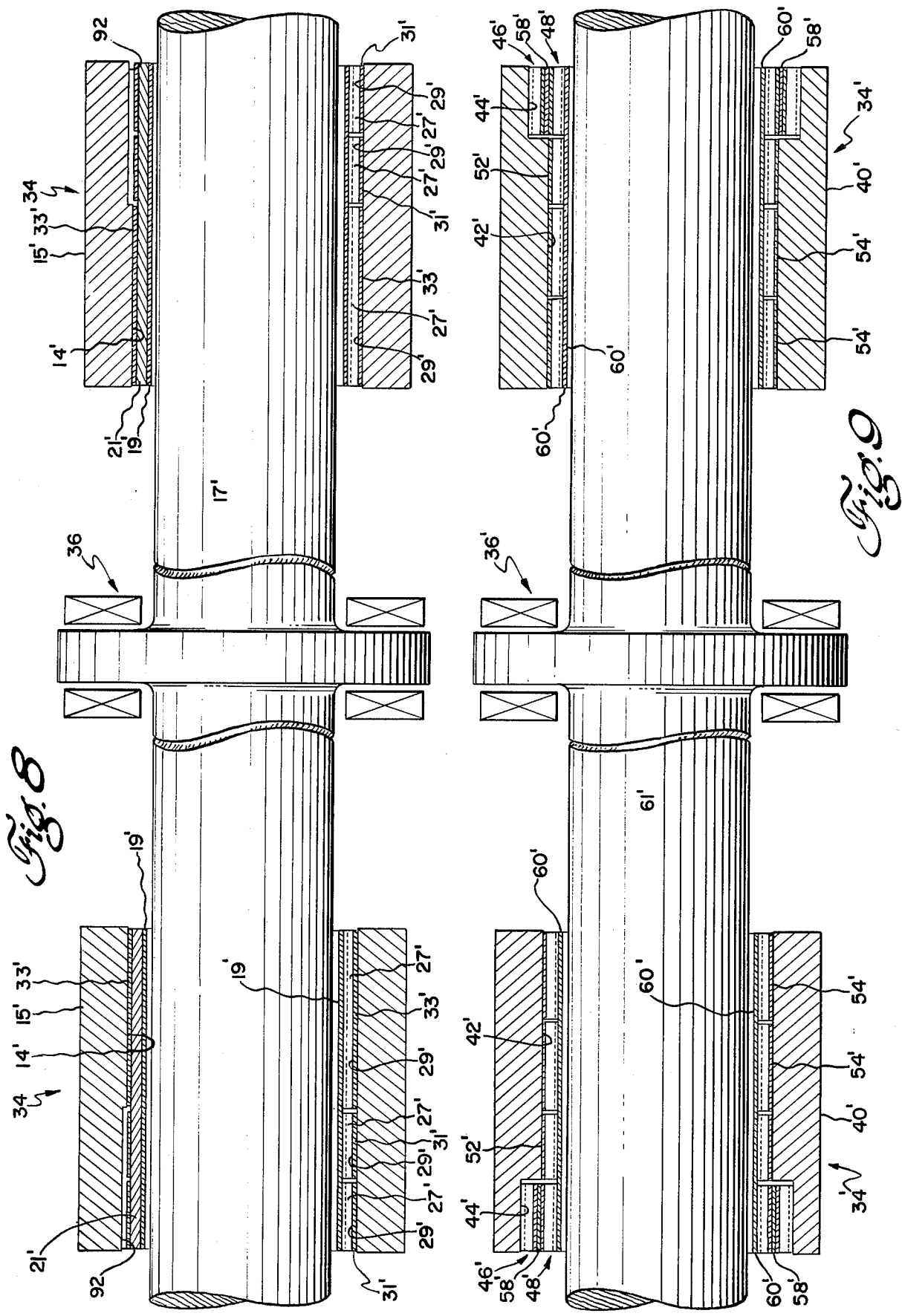

SUPPORT ELEMENT FOR COMPLIANT HYDRODYNAMIC JOURNAL BEARINGS

BACKGROUND OF THE INVENTION

Compliant hydrodynamic gas journal bearings are being used in high performance machinery subject to extreme conditions of temperature and speed. These bearings are ideally suited for these conditions because they do not suffer from the speed and durability limitations of rolling element bearings. Also, they do not require oil lubrication and therefore are free of the temperature limitations of oil. In addition, the oil seals and the pumping, cooling and filtering equipment necessary for use in oil bearings are rendered unnecessary, thereby producing a significant weight and cost saving which is desirable, especially in aviation applications.

The compliant hydrodynamic journal bearing employs a composite bearing assembly including a resilient supporting element and an attached overlying bearing sheet. This composite bearing lines the surface of the journal sleeve and is in bearing relationship to the shaft surface. Briefly, the theory of this bearing posits a hydrodynamic supporting gas film generated by the relative movement of the shaft surface over the bearing sheet to support the shaft on a thin cushion of gas over the bearing sheet. The compliance of the supporting element underlying the bearing sheet enables it to deflect to assume the optimum shape relative to the shaft surface to produce the maximum supporting fluid pressure and distribution. It also enables the bearing sheet to conform, to some extent, to misaligned, unbalanced, and thermally distorted shafts.

Despite the proven advantages that the use of these bearings confer, we have recognized certain potential advantages which may accrue from a refinement of these bearings for certain applications such as ground vehicles and particularly in aviation applications. High speed rotating machinery experiences a strong gyroscopic effect during deviation from straight-line motion, causing strong transaxial forces to be exerted on the bearings. These forces are proportional to the moment of inertia of the rotor, the rotation speed of the rotor, and the angular velocity of vehicle executing the maneuver. Increasing the rotor speed, and the speed and maneuverability of the vehicle increases these forces to the extent that, during certain evasive movements of high performance fighter aircraft, for example, the forces can exceed the load capacity of the bearing.

Failure can occur in misaligned shafts supported by compliant hydrodynamic fluid bearings when the fluid film between the relatively rotating parts is unable to carry the load tending to force those parts together. When this happens, the metal surfaces come into contact at high rotational speeds causing damage to the bearing.

SUMMARY OF THE INVENTION

Accordingly, the objectives of this invention are to provide a compliant hydrodynamic fluid journal bearing with improved load capacity, and with a greater tolerance of misaligned load conditions.

These objectives are satisfied by the disclosed embodiments of the invention which are based on our hypothesis that the load-carrying capacity of a fluid film bearing supporting a misaligned shaft can be greatly increased if the outside portion of the bearing is able to deform and spread the load, otherwise carried by the edge of the bearing, over the outside portion and possibly to parts of the central portion, so that the extreme outside edge of the bearing need not carry the entire misalignment load. We later confirmed this hypothesis by testing several journal bearings provided with outside portions which are softer than and independently compliant of the inside portions. We found that they are able to carry a greater load over a greater misalignment angle. The redistribution of load over a greater area subjects the load bearing surface to lower pressures which the bearing is able to carry. The embodiments are journal bearings having radially outside portions formed by separate resilient support sections having a stiffness different from the radially inside portion, and which can deform independently of the inside portion.

DESCRIPTION OF THE DRAWINGS

The invention and its objects will become more clear upon reading the following description in conjunction with an examination of the following drawings, wherein:

FIG. 8 is a schematic elevation of a bearing pair corresponding to the single bearing of FIG. 1; and FIG. 9 is a schematic elevation of a bearing pair corresponding to the single bearing of FIG. 4.

DESCRIPTION OF THE PREFERRED EMBODIMENTS

Figure 1:
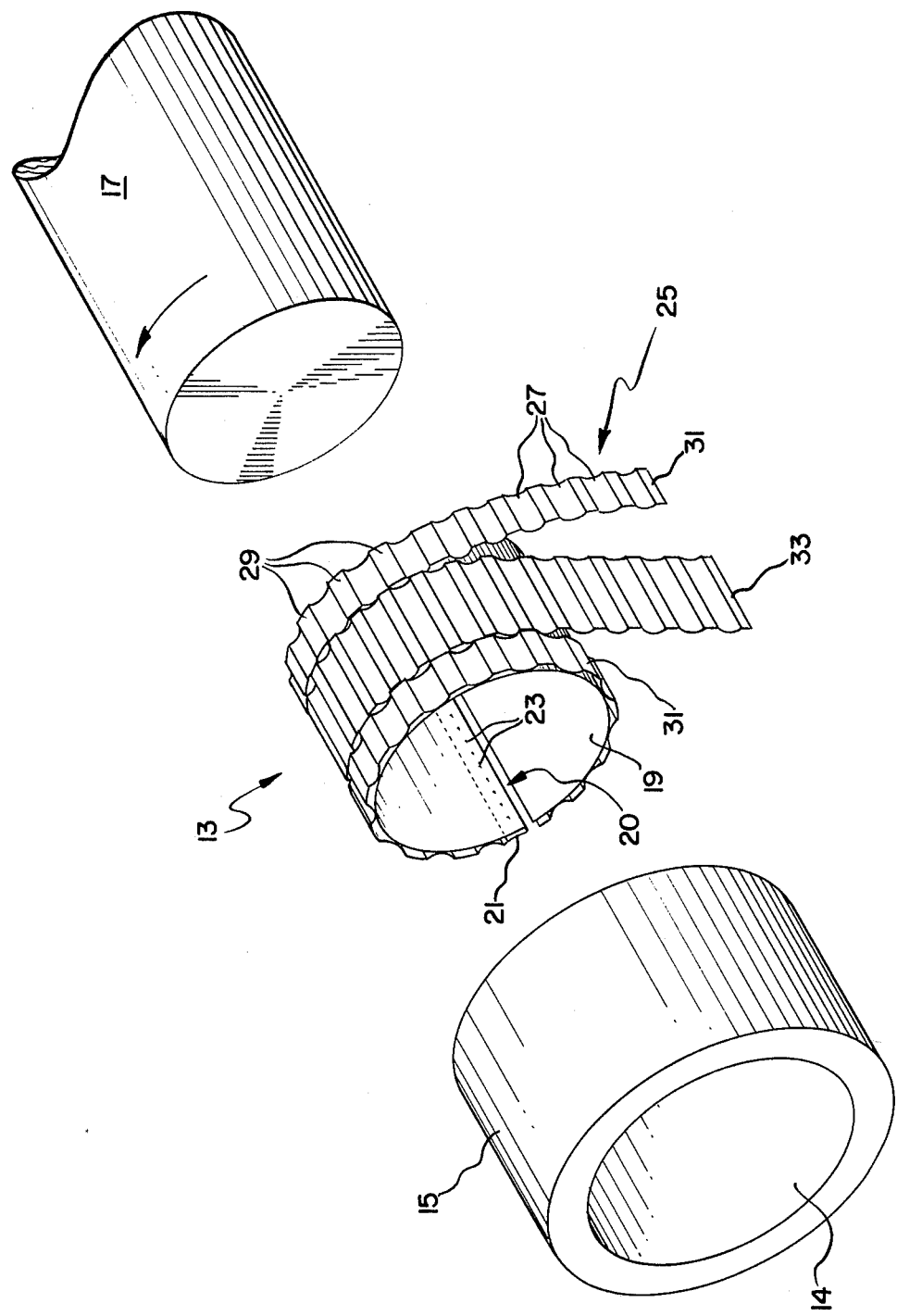
FIG. 1 is an exploded perspective view of one embodiment of a journal bearing made in accordance with this invention.

Referring now to the drawings wherein like and primed reference characters designate identical and corresponding parts, respectively, and more particularly to FIG. 1 thereof, a single compliant hydrodynamic fluid journal bearing is shown having a bearing assembly 13 received within the bore 14 of a stationary mount such as a bearing sleeve 15. A rotor, such as a shaft 17, fits within the bore 14 defining between the bore 14 and the surface of the shaft 17 a gap within which the bearing assembly 13 is received.

The bearing assembly 13 includes a smooth, flexible bearing sheet 19 fastened at one end 20 to one face of a spacer block 21, as by resistance welding indicated at 23. A resilient compliant support element 25 is fastened, also at one end 20, to the other face of the spacer block 21, also by resistance welding. The end 20 of the entire assembly 13 is resistance welded to the wall of the bore 14, leaving the other end of the sheet 19 and the element 25 of the bearing assembly 13 free to move circumferentially during thermal expansion and under loading by the shaft to provide the necessary freedom for assuming the correct hydrodynamic profile.

The resilient support element 25 is formed of a series of corrugated metal strips that extend parallel to the direction of movement of the bearing movable member, or shaft 17, and have raised resilient projections 27 and intervening flat sections 29 joining the projections 27. The projections 27 will deform under load, flattening slightly and causing an increase in the circumferential length of the support element 25. The flat sections 29 are in load bearing contact with the wall 14 of the bearing sleeve 15 and provide coulomb or frictional damping in the scrubbing contact which occurs in the course of the circumferential movement of the element 25.

The outside strips 31 are more compliant than the primary or center strip 33 and can flex independently of it. One way of making the strips 31 more compliant than, and independent of, strip 33 is to give strips 31 a pitch length greater than, and width less than, that of the central strip 33. The purpose of making the strips independent and more compliant, as explained in more detail below, is to enable the support element 25, in the event of a misalignment between the axis of the shaft 17 and the bearing sleeve, to deflect at one end to spread the load over a wide area of the bearing sheet 19 and prevent a deformation of one end of the support element 25 causing changes in the shape of the other end.

Another technique for making the edge strips 31 more compliant, i.e. less stiff, is by forming them of more compliant material, that is, a different composition or the same composition but of a thinner gauge. In the case of thinner gauge material, a shim could be inserted under the edge strips to elevate them to the same height as the central strip 33, or the projections 27 could be formed with a greater height. The stiffness can also be varied by changing the height and length of the bumps on the edge strips.

As indicated above, the independently compliant axial end strips 31 are provided to enable the bearing to bear a greater misalignment load. The corrugated form of the resilient support member of the prior art, illustrated for example in U.S. Pat. No. 3,809,443, is compliant in the circumferential direction because of the corrugations in the resilient support member. That is, it can bend easily about an axis parallel to the direction of the corrugations, but resists bending about an axis perpendicular to the corrugations and in the plane of the flat sections 29. Accordingly, when a misalignment load is applied to the shaft or when the bearing axis is tilted relative to the shaft axis, the fluid film thickness in the axial direction of the shaft will be non-uniform, because the stiffness of the resilient support element in this direction prevents it from deflecting under the load and prevents the bearing sheet from freely conforming to the relatively tilted orientation of the shaft surface. This results in a wedge-shaped fluid support film sloping in the axial direction illustrated (greatly exaggerated for purposes of clarity) in FIG. 2. As illustrated in the pressure diagram under the bearing in FIG. 2, the only significant load carrying areas in the bearing in the illustrated misalignment condition are at the zones in the vicinity of the apex 35 of the wedge at each end of the bearing. The pressure of the supporting fluid can be quite high at this apex zone, but because the area over which the supporting fluid film acts is so small, the load bearing capacity is low, and can be exceeded, with resulting contact between metal surfaces, when subjected to even light loads under extreme misalignment conditions.

Figure 2:
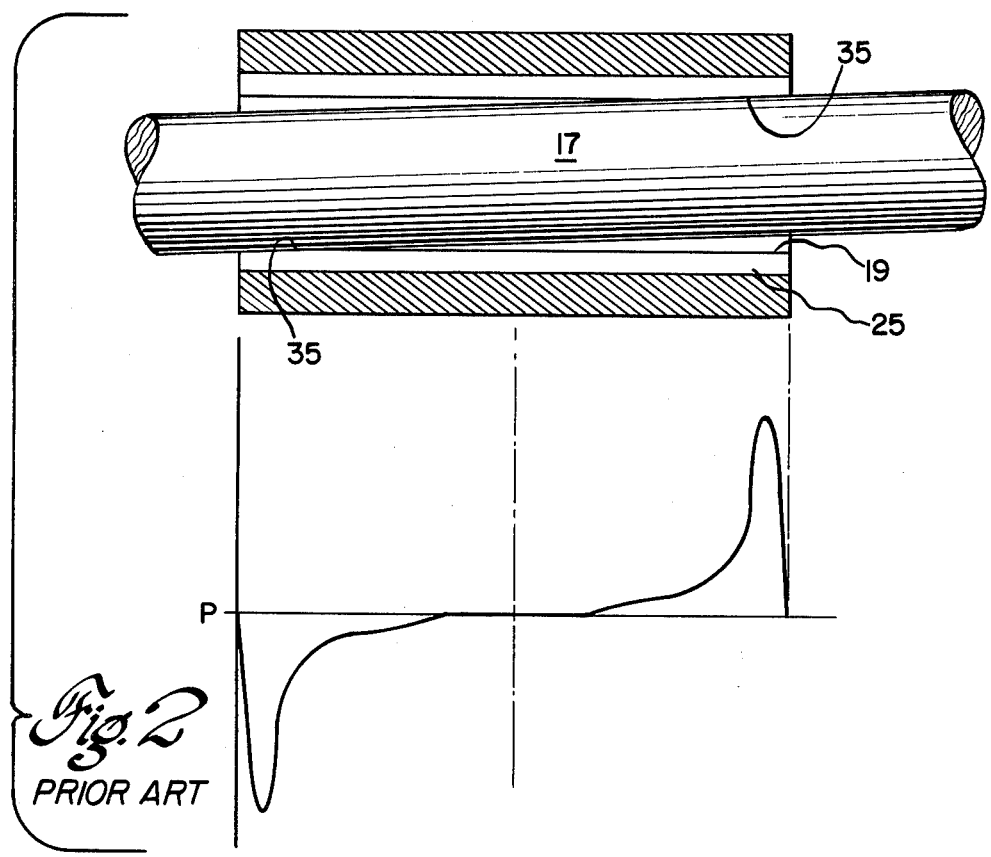
FIGS. 2 and 3 are sectional elevations taken parallel to the axis of the shaft of a prior art bearing and the bearing shown in FIG. 1, respectively, and their pressure curves under pure moment loading conditions.
Figure 3:
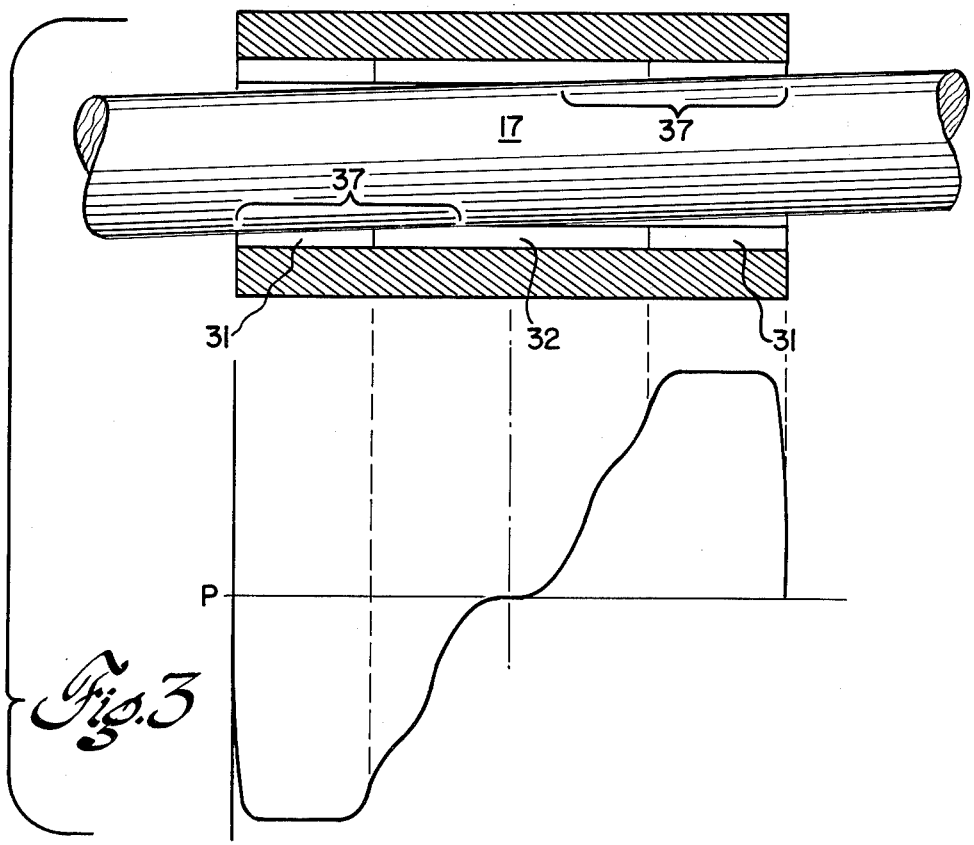

It might be well to note at this point that the condition illustrated in FIGS. 2 and 3 is a "pure moment" misalignment and is only a theoretical misalignment situation. FIGS. 2 and 3 are included to illustrate some of the concepts underlying the invention and to facilitate clarity of discussion, not to show the actual loading conditions in a real journal bearing. Normally, as illustrated in FIGS. 8 and 9, a rotor is supported on a journal bearing 34 at each end, and on a thrust bearing 36 having thrust bearing surfaces facing in both axial directions. The closest actual approximation to the condition illustrated in FIGS. 2 and 3 would be if one of the journal bearings were misaligned with respect to the true shaft axis, and there were no load on the shaft. The journal bearings will always be misaligned to some degree, but in addition, there will always be other forms of significant loading on the journal bearings. For example, there will be transaxial forces exerted on the journal bearing by the rotor mass, by eccentric loading from power input or take-off and rotor unbalance, and a couple will be exerted by a high speed rotor on its bearing system when the machine executes a sudden change of direction. The pressure diagram in these more common situations would be more complex and would needlessly complicate the discussion.

One solution to eliminate the load concentration at the extreme axial end edges of the bearings is to provide a means to enable the axial end zones of the compliant support member to yield independently of the central zone. The naturally high stiffness of the compliant support member produced by the corrugations along the axial direction does not in this embodiment prevent the compliance of the resilient support member at the axial ends of the support member which is necessary to enable the bearing sheet to conform to the slope of the shaft. This situation is illustration in FIG. 3 which shows the outside compliant strips 31 deforming under hydrodynamic fluid forces to provide a broad supporting zone 37 for the bearing sheets at the two ends of the misaligned shaft. In the assembly illustrated, the support provided by the bearing system of this invention illustrated in FIG. 3 is substantially greater than that of the prior art illustrated in FIG. 2.

The shorter width and greater pitch length of the outside strips 31 enables the axial end zones to deform under lesser loads than the axial center zone. The purpose of this is to facilitate a gradually increasing deformation of the support member along the axis of the bearing, following the tilted surface of the shaft. To better enable the independently deformable outside strips to provide a zone of support which will conform to the tilted slope of the shaft during this misalignment, these outside strips are made more compliant than the central zone. The greater compliance can also be achieved by thinner gauge material, lower bump heights, longer bump length or less resilient material.

The pressure diagrams under the bearings in FIGS. 2 and 3 illustrate the improved operation achieved by this invention. The support zones 37 of the bearing in FIG. 3 cover a wider area and the mean pressure of the supporting fluid film is greater. The greater load carrying area and the higher pressure result in a significant improvement over the prior art compliant journal bearing illustrated in FIG. 2.

Figure 4:
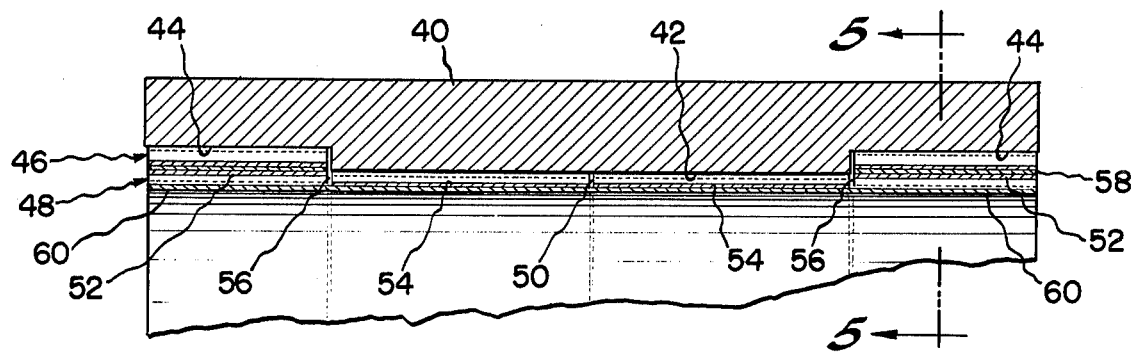
FIG. 4 is an elevation, partly in section, of another embodiment of a journal bearing made in accordance with this invention.

A second embodiment of the invention shown in FIG. 4 includes a cylindrical journal sleeve 40 having an axial bore 42 extending therethrough, and an axial counterbore 44 at each axial end of the sleeve 40. A compliant support element lines the bore and includes a first layer 46 which lies in the counterbore 44 at each end of the sleeve, and a second layer 48 which extends the entire length of the bore and lies over the first layer 46. This arrangement produces a single layer in the central portion between the counterbores 44, and a double layer over the counterbore.

The layers 46 and 48 each include strips of corrugated sheet metal approximately 0.004 inches thick. The corrugations are the same form as that shown in the embodiment of FIG. 1, that is, an array of resilient, compliant bump-form elevations separated by flat land portions. The second layer 48 is divided into two axial halves by a circumferential slit 50 extending completely through the second layer 48 and completely around its circumference. Each half may be divided into an axial end piece 52 and a central piece 54 by a second circumferential slit 56 extending completely around and through the axial halves. The slit 56 is located at or slightly axially beyond the step formed by the counterbore 44.

The first layer 46 is separated from the second layer axial end piece 52 by a thin metal strip 58 which is as wide as, or just slightly narrower than, the axial depth of the counterbore 44. The axial end piece 52 of the second layer lies over the thin metal strip 58 whose inner surface lies at the same radius from the bearing sleeve axis as the inner wall of the axial bore 42. The elevations of the axial end pieces 52 thus lie flush with the elevations of the central pieces 54. A bearing sheet 60 is supported on the second layer pieces 52 and 54 and dynamically supports the shaft 61 for rotation in the direction shown by the arrow 63.

The first layer pieces 46 and the second layer pieces 52 and 54 can all deflect independently of each other so a deflection of one end of the support element is not impeded by and does not cause deflection of, the other end. Moreover, the two layers of corrugated strips 46 and 52 at each end of the bearing sleeve act as springs in series, and therefore, when the strips are identical, the two layer strip is half as stiff as one strip alone, so the strips can deflect readily and spread the bearing load over a greater load bearing area. Finally, the two layers acting in the counterbore 44 can deflect much farther than a single layer would be able to, thus greatly increasing the range of misalignment which the bearing can tolerate before the gas film is breached.

Figure 5:
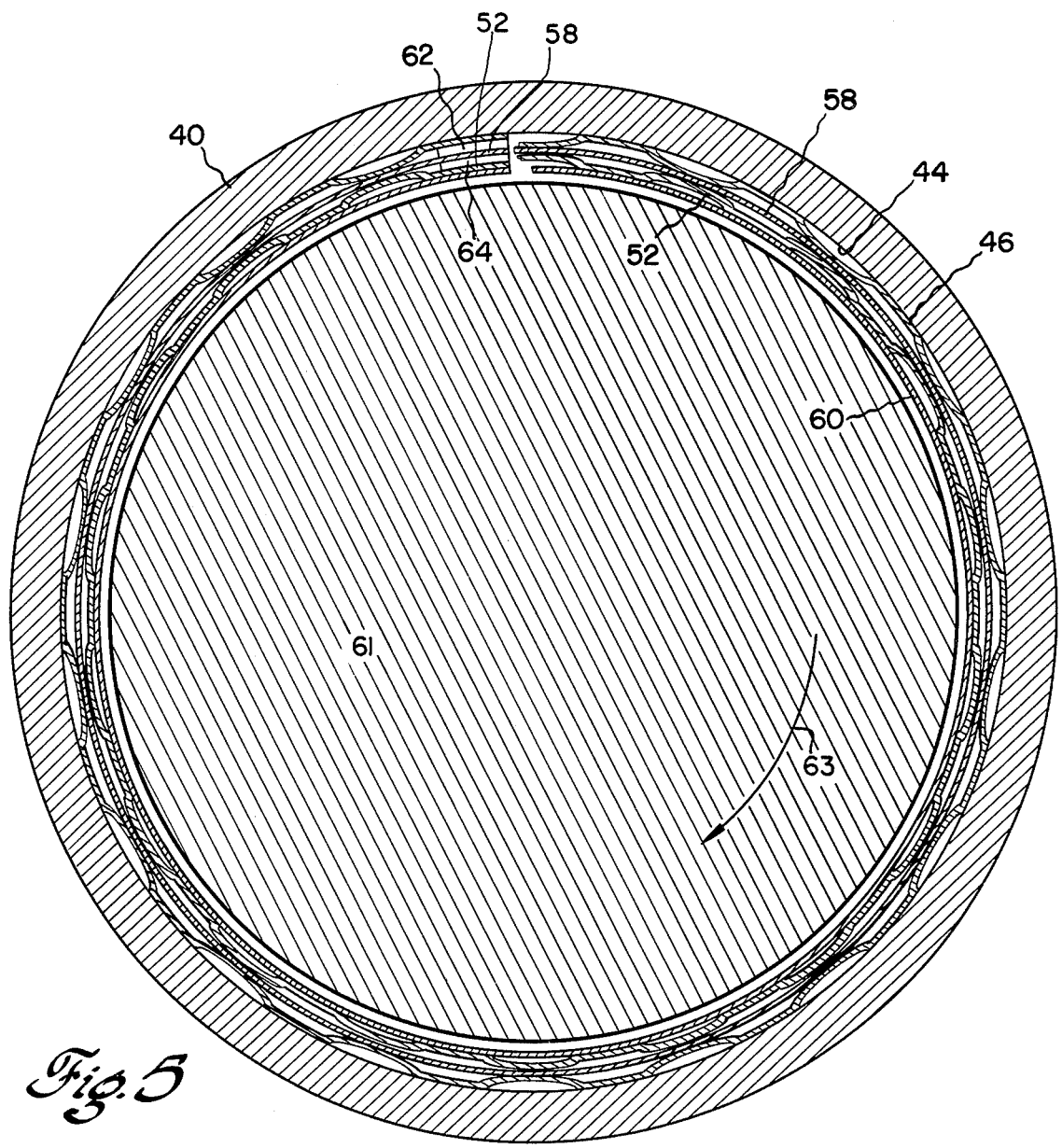
FIG. 5 is a sectional elevation along lines 5—5 in FIG. 4.

The bearing elements are fastened in the bore 42 of the bearing sleeve in the same manner as that used in the embodiment of FIG. 1. That is, the strips 54 are fastened to the underside of a central spacer block (not shown), like the spacer block 21 in FIG. 1, and the spacer block and strips 54 are welded to the wall of the bore 42. The end strips 46 and 52 are fastened together as shown in FIG. 5. The first layer 46 is welded to the wall of the counterbore 44. A spacer block 62 is welded to the top of the first layer 68; the end of the separator strip 80 is welded to the top of the spacer block 78; a second spacer block 86 is welded to the top of the separator strip 58, and the second layer end piece 52 is welded to the top of the second spacer block 64. Finally, the bearing sheet 60 is welded to the top of the central spacer block and to the top of the end strips 52.

The end strips 46 and 52 can be aligned in the same manner as the two-layer resilient support element shown in the co-pending application of Gray and McCormick, Serial No. 974,255 entitled "Compliant Hydrodynamic Bearing with Improved Support Element" filed on Dec. 29, 1978, the disclosure of which is hereby incorporated by reference.

Figure 6:
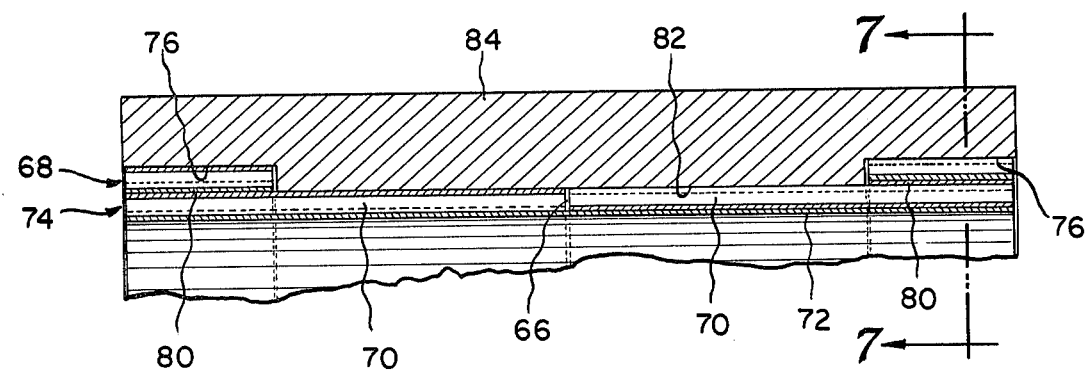
FIG. 6 is a sectional elevation of a third embodiment of a journal bearing made in accordance with this invention.

The bearing of FIG. 4 can be made without the slits 56, as shown in FIG. 6. We have tested this embodiment and find it produces good results. However, we believe the form illustrated in FIG. 4 will offer certain advantages in that the axial end pieces 52 can deflect independently along with the first layer sections 46 and therefore should be somewhat more compliant. However, the independently compliant edge strips of the first layer in the embodiment of FIG. 6 do produce a more compliant edge zone at each end of the bearing than the prior art even when the second layer is not slit at 56 but is slit only in the center at 66.

Figure 7:
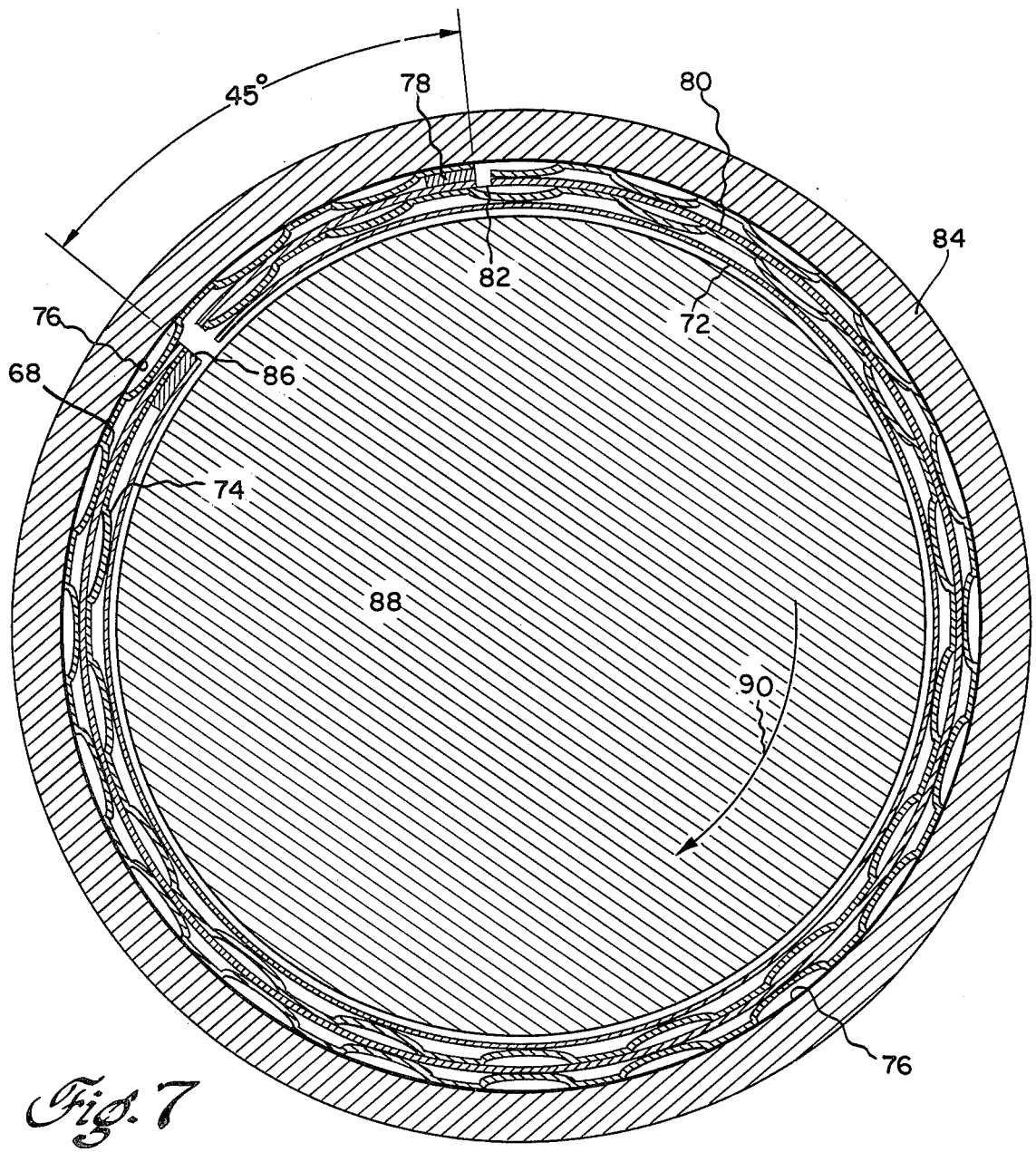
FIG. 7 is a sectional elevation along lines 7—7 in FIG. 6.

The configuration for fastening the bearing components in the bearing sleeve for the embodiment of FIG. 6 is illustrated in FIG. 7. In this embodiment, the spacer blocks are not vertically aligned because it was anticipated that the need might arise to change the first layer or outside strips 68 without disturbing the strips 70 of the second layer 74. The capacity to do this is achieved by displacing the outside strips 68 clockwise (in FIG. 7) 45° so that the bearing sheet 72 and the second layer 74 can be lifted to expose the end of the first layer 68 which is fastened to the wall of the counterbore 76. This enables the first layer 68 to be removed and replaced, if necessary, without disturbing the second layer 74.

One end of the first layer corrugated bump strip 68 is welded to the wall of the counterbore 76 and a spacer block 78 is welded to the top of it. The separator strip 80 is welded to the top of it. The separator strip 80 is welded to the top of the spacer block 78 and its top surface lies flush with the wall of the bore 82 in the bearing sleeve 84. The two halves 70 of the second layer 74 support members are welded to the underside of a second spacer block 86, and the bearing sheet 84 is welded to its top surface. The second layer assembly 74 is then inserted into the bore 82 and is welded to its wall, overhanging in cantilever fashion the two end counterbores 76. This enables the spacer block 86 to flex in the region of the double layer support, thereby reducing the support member stiffness over the spacer block 86. The second spacer block 86 is angularly displaced upstream 45° from the first spacer block 78, that is, in the direction opposite to the direction of rotation of the shaft 88, indicated by the arrow 90.

In practice, journal bearings are almost always used in pairs, one at or near each end of the shaft which they support, as illustrated in FIGS. 8 and 9. The journal bearings illustrated in FIGS. 1–7 are single bearings which can be used as shown or can be used in pairs. These bearings were also used to test the inventive concepts in a test rig which could apply selected loads and angles of misalignment. These single test bearings also simulate an axially spaced pair of bearings, as used in practical applications.

Thus, the disclosed embodiments can also each represent a pair of axially spaced journal bearings. That is, the end strips 31 of the bearing in FIG. 1 could, in a practical bearing application, be on the outside edges of a bearing pair, as shown in FIG. 8, and the end strips of the bearing in FIG. 4 could be on the outside edges of the bearing pair as shown in FIG. 9. Only one of the outside strips on each journal bearing sleeve in the embodiment of FIG. 9 is a double layer, because it is desirable to establish an axial stiffness gradient at the outside ends of the bearing pair. Similarly, an axial stiffness gradient is established in the embodiment of FIG. 8 by making the outermost edge strip of more compliant material or of greater bump pitch than the adjacent strip.

The spacer block 21' in FIG. 8 is welded to the journal sleeve 15' only along the width of the inner or primary support zone 33'. Along the end strips 31' it overhangs a slight undercut 92 to give the spacer block 21' room to flex away from the shaft 17' during operation so that the stiffness of the support element over the spacer block 21' is reduced.

The disclosed embodiments of the invention have an improved ability to conform to the slope of the shaft during excursions from its designed axis, such as occurs during eccentric loading or unbalance runout, or in the case of a misaligned shaft or bearing. In these situations, the edge sections can yield and spread the load over a wide load bearing area so the fluid film is not breached. In addition, the several axial sections of the support element can deflect independently of each other so the deflection at one end is not impeded by, nor causes distortion of, the other end. Thus, the bearing can tolerate a greater degree of misalignment or runout under a higher load.

Obviously, numerous modifications and variations of the disclosed embodiments may be made to achieve the objects and other advantages of the invention.

These modifications are expressly intended to be encompassed within the spirit and scope of the invention as defined by the following claims, wherein we claim:

1. A compliant hydrodynamic fluid film journal bearing comprising:
    a journal bearing sleeve and a rotatable shaft defining therebetween a gap;
    a resilient support element positioned in said gap and connected to said sleeve, said element having a series of raised compliant resilient projections;
    a flexible bearing sheet connected to said sleeve and overlying said support element and being supported thereby;
    said support element having a primary zone, and having two end zones at different axial positions along said sleeve from said primary zone, said zones each including at least one circumferentially extending strip running generally parallel to the direction of relative movement of said shaft;
    said end zones having portions which are compliant independently of said primary zone and each other, and having a compliance different from that of said primary zone.

2. The bearing defined in claim 1, wherein said primary zone is itself divided into a plurality of primary strips which are themselves compliant independently of each other.

3. The bearing defined in claim 2, wherein each of the strips in said primary zone is stiffer than at least one of said strips in said end zones.

4. The bearing defined in claim 1, wherein said projections are corrugations of said strips and said corrugations on at least one of said end zone strips are of longer pitch than the corrugations on said primary zone strip.

5. The bearing defined in claim 1, wherein the width of each of said strips in said end zones is about one-quarter to one-sixth of the width of the entire support element.

6. The bearing defined in claim 5, wherein said projections are corrugations, and the corrugations on said end zone strips are of longer pitch than the corrugations on said primary zone, and said end zone strips are more compliant than said primary zone strip.

7. The bearing defined in claim 5, wherein said projections are corrugations, and the corrugations on said end zone strips are of more compliant material than the material of which the primary zone is made, so the end zone strips are more compliant than said primary zone.

8. The bearing defined in claim 1, wherein each of said end zones includes an edge strip on which said raised compliant resilient projections are formed, said edge strips being radially stacked, one upon the other, and having their raised compliant resilient projections forming a series spring system having improved compliance and stress capacity.

9. The bearing defined in claim 8, wherein one of said edge strips on an axial end of said sleeve is radially outside said primary zone strip.

10. The bearing defined in claim 9 wherein said other strip is itself divided into two separate axial sections.

11. The bearing defined in claim 8, wherein said one of said edge strips includes a separate, independently compliant inner edge strip radially aligned with the other of said edge strips, said two edge strips being axially located outside of said primary zone.

12. The bearing defined in claim 11 wherein said primary zone includes two independently compliant axially spaced and adjacent strips.

13. The bearing defined in claim 11, wherein each edge strip and said primary zone are each fastened to said sleeve along one axially aligned end edge.

14. A method of supporting a rotating rotor in a bearing on a stationary mount, when the rotor and bearing are subject to relative misalignment, comprising:
    supporting the rotor on a smooth, flexible bearing sheet having a bearing surface in bearing relationship to an opposed bearing surface on the rotor;
    supporting the bearing sheet on a resilient, compliant supporting element that deflects under load to enable the bearing sheet to assume a profile that is conducive to the generation and maintenance of a supporting hydrodynamic fluid film between the bearing sheet and the rotating rotor; said supporting element having two edge portions, along at least one edge parallel to the rotation direction of said rotor, and a primary portion, said two edge portions being compliant independently of said primary portion and being more compliant than said primary portion;
    rotating said rotor relative to said bearing sheet to generate a hydrodynamic supporting fluid film between said bearing surfaces;
    deflecting said edge portions independently of said primary portion in the presence of misalignment conditions to spread the load over a large area of said bearing sheet and thereby minimize the pressure so that fluid film will support the load.

15. A compliant hydrodynamic fluid film journal bearing system comprising:
    two axially spaced and axially aligned journal bearing sleeves and a rotatable shaft positioned within said sleeves and defining a gap between each sleeve and said shaft;
    a resilient support element positioned in each gap, each being connected to one of said sleeves, and having a series of raised compliant resilient projections;

a flexible bearing sheet in each sleeve connected thereto and overlying each said support element and being supported thereby;

said support elements each having an inner zone on the axial end of the sleeve facing the other journal sleeve, and two outer zones at different axial positions along said sleeve from said inner zone and on the axial end of said sleeve remote from the other sleeve, said zones all including circumferentially extending strips running generally parallel to the direction of relative movement of said shaft;

said outer zones having portions which are compliant independently of said inner zones, and having a compliance different from that of said inner zones.

16. The bearing system defined in claim 15, wherein said inner zones are themselves divided into a plurality of inner strips which are themselves compliant independently of each other.

17. The bearing system defined in claim 16, wherein each of the strips in said inner zones are stiffer than at least one of said strips in said outer zones.

18. The bearing system defined in claim 15, wherein said projections are corrugations of said strips and said corrugations are of longer pitch on said strips in said outer zones than on said inner zones.

19. The bearing system defined in claim 15, wherein the width of each of said strips in said outer zones is about one-quarter to one-sixth of the width of the entire support element in each bearing sleeve.

20. The bearing system defined in claim 19, wherein said projections are corrugations, and the material on said strips in said outer zones is of thinner gauge than the material on said inner zones, and said outer zone strips are more compliant than said inner zones.

21. The bearing system defined in claim 15, wherein said outer end zones each include a first edge strip on which said raised compliant resilient projections are formed, said edge strips being radially stacked, one upon the other, and having their raised compliant resilient projections forming a series spring system having improved compliance and stress capacity.

22. The bearing system defined in claim 21, wherein each said first edge strip in each journal sleeve is radially outside said inner zone strip.

23. The bearing system defined in claim 22 wherein said inner zone strip is itself divided into two separate axial sections.

* * * * *